(12) United States Patent
Liu et al.

(10) Patent No.: US 10,429,708 B2
(45) Date of Patent: Oct. 1, 2019

(54) ARRAY SUBSTRATE, DISPLAY PANEL AND DISPLAY DEVICE

(71) Applicant: BOE TECHNOLOGY GROUP CO., LTD., Beijing (CN)

(72) Inventors: Liwei Liu, Beijing (CN); Yunsik Im, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/939,020

(22) Filed: Mar. 28, 2018

(65) Prior Publication Data
US 2019/0041710 A1 Feb. 7, 2019

(30) Foreign Application Priority Data
Aug. 1, 2017 (CN) .......................... 2017 1 0650559

(51) Int. Cl.
*G02F 1/1362* (2006.01)
*G02F 1/1335* (2006.01)
*G02F 1/1339* (2006.01)

(52) U.S. Cl.
CPC ...... *G02F 1/136286* (2013.01); *G02F 1/1339* (2013.01); *G02F 1/133512* (2013.01)

(58) Field of Classification Search
CPC ......... G02F 1/136286; G02F 1/133512; G02F 1/1339
See application file for complete search history.

(56) References Cited

U.S. PATENT DOCUMENTS

| | | | |
|---|---|---|---|
| 2005/0275328 A1* | 12/2005 | Tseng ................. | G02F 1/13394 313/292 |
| 2008/0266498 A1* | 10/2008 | Kim .................... | G02F 1/13394 349/110 |
| 2011/0261309 A1* | 10/2011 | Huang ................ | G02F 1/13394 349/144 |
| 2015/0253607 A1* | 9/2015 | Cho .................... | G02F 1/13394 349/110 |
| 2016/0187701 A1* | 6/2016 | Zheng ............... | G02F 1/133345 349/106 |

* cited by examiner

*Primary Examiner* — Sitaramarao S Yechuri
(74) *Attorney, Agent, or Firm* — McDermott Will & Emery LLP

(57) ABSTRACT

An array substrate includes a first base substrate, and gate lines and data lines arranged on the first base substrate. The gate lines and the data lines crosswise define pixel regions, wherein the pixel regions include light transmission areas one-to-one. The array substrate further includes a first raised structure arranged between a main spacer initial contact area and one of the light transmission areas, wherein the first raised structure is configured to provide a blocking function to a movement of a main spacer.

15 Claims, 8 Drawing Sheets

ARRAY SUBSTRATE, DISPLAY PANEL AND DISPLAY DEVICE

CROSS-REFERENCE TO RELATED APPLICATION

This application claims priority to Chinese Patent Application No. 201710650559.2, filed on Aug. 1, 2017, titled "ARRAY SUBSTRATE, DISPLAY PANEL AND DISPLAY DEVICE", which is incorporated herein by reference in its entirety.

TECHNICAL FIELD

The present disclosure relates to the field of display technology, more particularly, to an array substrate, a display panel and a display device.

BACKGROUND

Since a thin film transistor-liquid crystal display (TFT-LCD) has features of small size, low power consumption, no radiation, etc, it has been developed rapidly in recent years, and dominates the current display field.

A main structure of a liquid crystal display includes a liquid crystal display panel. The liquid crystal display panel includes an array substrate and an alignment substrate which are aligned, and a liquid crystal layer located between the array substrate and the alignment substrate. The array substrate and the alignment substrate are sealed with each other by sealant. The thickness of the liquid crystal layer is mainly controlled by spacers located on the alignment substrate. The spacers include main spacers and auxiliary spacers which make different contributions. The length of a main spacer is greater than that of an auxiliary spacer.

SUMMARY

In a first aspect, some embodiments of the present disclosure provide an array substrate, including a first base substrate; gate lines and data lines arranged on the first base substrate, wherein the gate lines and the data lines crosswise define pixel regions, and the pixel regions include light transmission areas wherein one pixel region includes one light transmission area; and a first raised structure arranged between a main spacer initial contact area and one of the light transmission areas, wherein the first raised structure is configured to provide a blocking function to a movement of a main spacer.

In some embodiments of the present disclosure, a first distance between a side of the main spacer initial contact area close to the first raised structure and a side of the first raised structure away from the main spacer initial contact area, is larger than a difference between a maximum moving distance of the main spacer and a half of a length of the main spacer in a direction along the data lines.

In some embodiments of the present disclosure, a thickness of the first raised structure is increased from an edge to a center.

Furthermore, in some embodiments of the present disclosure, a side of the first raised structure close to the main spacer initial contact area is in a stepped structure.

In some embodiments of the present disclosure, the first raised structure includes a first pattern layer and a second pattern layer; the first pattern layer and the gate lines are arranged in a same layer; and the second pattern layer and the data lines are arranged in a same layer.

In some embodiments of the present disclosure, the gate lines arranged between adjacent ones of the pixel regions are in pair.

In some embodiments of the present disclosure, the main spacer initial contact area is located on one of the regions which are respectively next to the pixel regions in blue and provided with some of the gate lines.

In some embodiments of the present disclosure, the array substrate further includes a second raised structure arranged between an auxiliary spacer initial projection area and one of the light transmission areas, and the second raised structure is configured to provide a blocking function a movement of an auxiliary spacer.

In some embodiments of the present disclosure, a second distance between a side of the auxiliary spacer initial projection area close to the second raised structure and a side of the second raised structure away from the auxiliary spacer initial projection area, is larger than a difference between a maximum moving distance of the auxiliary spacer and a half of a length of the auxiliary spacer in the direction along the data lines.

In some embodiments of the present disclosure, a thickness of the second raised structure is increased from an edge to a center.

In some embodiments of the present disclosure, a side of the second raised structure close to the auxiliary spacer initial projection area is in a stepped structure.

In some embodiments of the present disclosure, the second raised structure includes a third pattern layer and a fourth pattern layer; the third pattern layer and the gate lines are arranged in a same layer; and the fourth pattern layer and the data lines are arranged in a same layer.

In a second aspect, some embodiments of the present disclosure provide a display panel, including an array substrate according to the above embodiments and an alignment substrate, wherein the alignment substrate includes a second base substrate and a main spacer arranged on the second base substrate; and the main spacer is in contact with the main spacer initial contact area when there has been no force acted on the display panel.

In some embodiments of the present disclosure, the alignment substrate further includes an auxiliary spacer arranged on the second base substrate, the array substrate further includes a second raised structure arranged between an auxiliary spacer initial projection area and one of the light transmission areas, and the second raised structure is configured to provide a blocking function to a movement of the auxiliary spacer.

In some embodiments of the present disclosure, the alignment substrate further includes a black matrix arranged on the second base substrate; and the light transmission areas on the array substrate are outside a shielding provided by the black matrix.

In a third aspect, some embodiments of the present disclosure provide a display device, including the display panel according to the foregoing embodiments.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in embodiments of the present disclosure will be described clearly and completely with reference to the accompanying drawings in the embodiments of the present disclosure. Obviously, the described embodiments are merely some but not all of the embodiments of the present disclosure. All other embodiments made on the basis of the embodiments of the present disclosure obtained by a person of ordinary skill in the art without paying any creative effort, shall be included in the protection scope of the present disclosure.

The inventors have already known that main spacers are in contact with an array substrate after the alignment of a liquid crystal display panel, to maintain a cell thickness by a supporting function, while auxiliary spacers are not in contact with the array substrate. Only when the display panel is acted upon by a great external force, the auxiliary spacers become contact with the array substrate to serve a supporting purpose.

When an external force is acted on the liquid crystal display panel, the main spacer is compressed, and may move. And the movement of the main spacer may damage an orientation layer. When the main spacer moves to a light transmission area of a pixel region, the damage of the orientation layer at the corresponding position will lead to poor orientation and further lead to light leakage.

Figure 1:
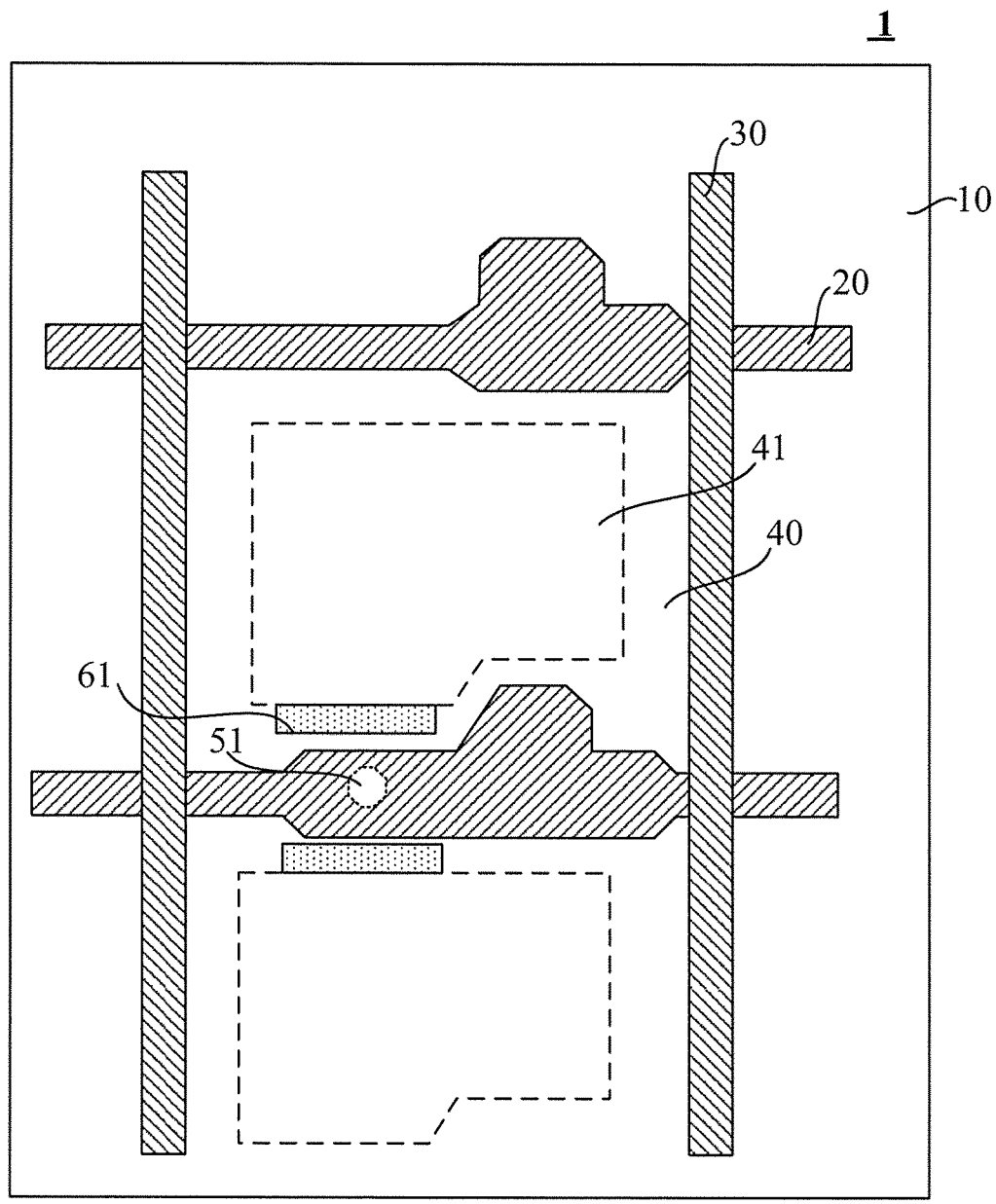
FIG. 1 is a top view of an array substrate according to some embodiments of the present disclosure.
Figure 2:
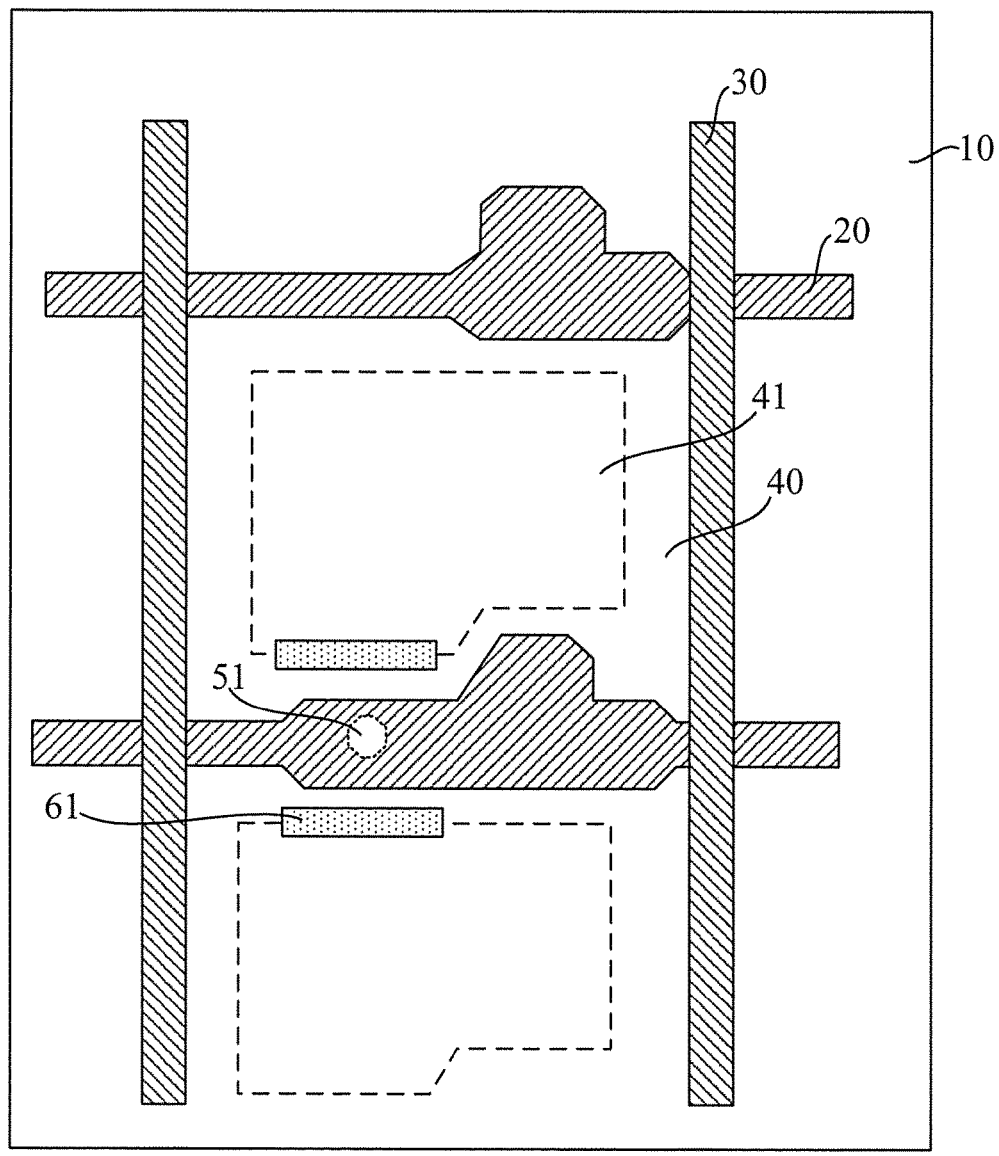
FIG. 2 is a top view of an array substrate according to some other embodiments of the present disclosure.

Regarding the above problem, some embodiments of the present disclosure provide an array substrate 1. As shown in FIG. 1 and FIG. 2, the array substrate includes a first base substrate 10, and gate lines 20 and data lines 30 arranged on the first base substrate 10. The gate lines 20 and the data lines 30 crosswise define pixel regions 40. A pixel region 40 includes a light transmission area 41. The array substrate further includes a first raised structure 61 arranged between a main spacer initial contact area 51 and a light transmission area 41. The first raised structure 61 is configured to provide a blocking function to a movement of a main spacer.

It should be noted that, when the array substrate and an alignment substrate are aligned to form a display panel, the main spacer located on the alignment substrate is in contact with a surface of the array substrate facing the alignment substrate, to maintain a cell thickness of the display panel by a supporting function.

The main spacer initial contact area 51 is an area where the main spacer on the alignment substrate contacts with the array substrate without moving, after the array substrate and the alignment substrate are aligned.

A pixel region 40 includes the light transmission area 41 and a light shield area. The light shield area, for example, is a region around the light transmission area. The light shield area is shielded by a black matrix after the array substrate and the alignment substrate are aligned, so light cannot pass through the light shield area. The light transmission area 41 allows light to pass therethrough.

The first raised structure 61 is located between the main spacer initial contact area 51 and a light transmission area 41. It is not limited that the first raised structure 61 cannot cross over a boundary of the light transmission area 41. In some embodiments, the first raised structure 61 is located on an edge of the light transmission area 41 with its part or entirety crossing over the boundary of the light transmission area 41.

In some embodiments, a specific location of the first raised structure 61 depends on a moving distance of the main spacer and a specific structure of the first raised structure 61. In some embodiments, the moving distance of the main spacer is obtained according to test data for various types of products.

Figure 3:
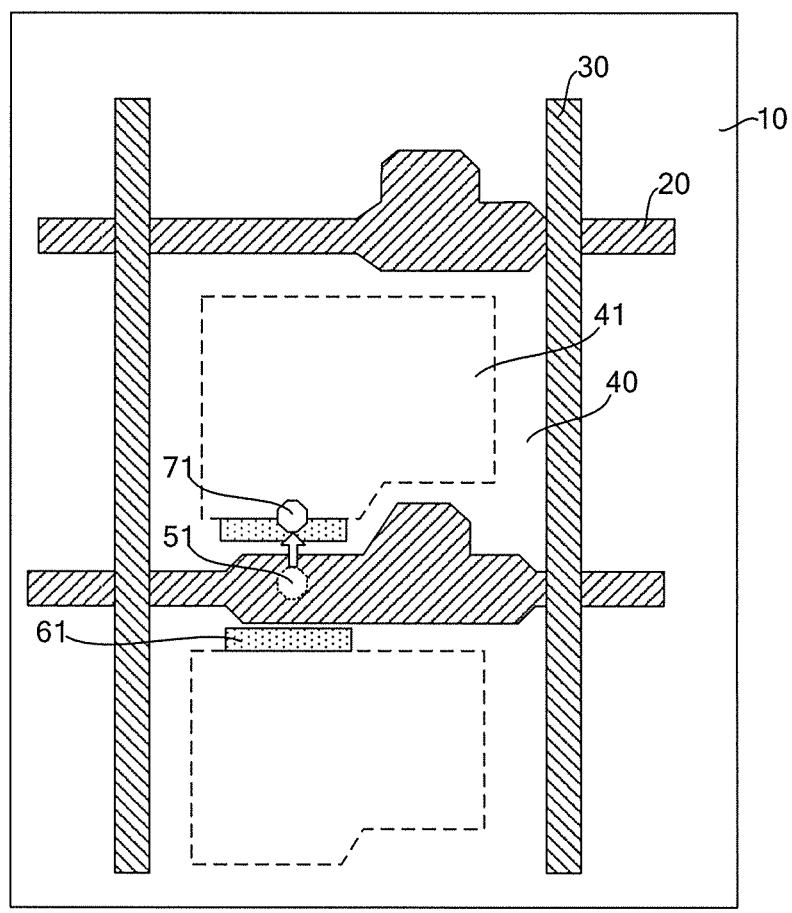
FIG. 3 is a schematic diagram of a movement of a main spacer acted upon by a force, according to some embodiments of the present disclosure.
Figure 5:
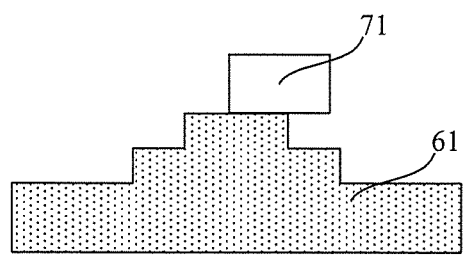
FIG. 5 is a schematic diagram of a main spacer which has reached a position on a first raised structure according to some embodiments of the present disclosure.

For example, as shown in FIG. 1, the first raised structure 61 is located between the main spacer initial contact area 51 and a boundary of the light transmission area 41 near the main spacer initial contact area 51. On this basis, it may be ensured that the main spacer is to be contact with a part of an orientation layer, which is located in the light transmission area 41, of the array substrate, when the main spacer moves by being subjected to a pressure. For example, in some situations, when the main spacer moves by being subjected to a pressure, the main spacer 71 is stopped on a side of the first raised structure 61 away from the light transmission area 41 due to the blocking of the first raised structure 61. That is, the main spacer 71 will not cross over the first raised structure 61. In some other situations, when the main spacer moves by being subjected to a pressure, as the main spacer 71 has a limited moving distance, although the main spacer 71 crosses over the first raised structure 61, it will not reach the light transmission area 41. In some further situations, when the main spacer moves by being subjected to a pressure, as shown in FIG. 3 and FIG. 5, although a part of the main spacer 71 moves to the light transmission area 41, because of the limited moving distance, the main spacer 71 is located on the first raised structure 61. Due to the height of the first raised structure 61, it is ensured that the part of the main spacer 71 located above the light transmission area 41 is not in contact with the orientation layer of the array substrate.

Figure 4:
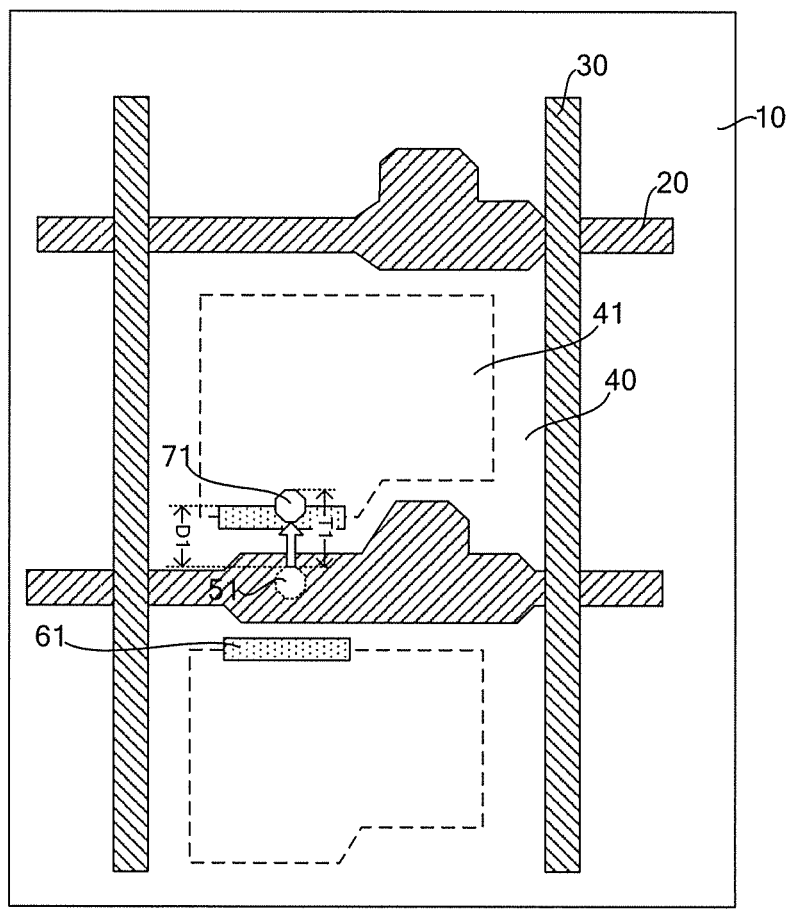
FIG. 4 is a schematic diagram of a movement of a main spacer acted upon by a force, according to some other embodiments of the present disclosure.

In some embodiments, as shown in FIG. 2, the first raised structure 61 is located on the edge of the light transmission area 41 near the main spacer initial contact area 51, with its part or entirety crossing over the boundary of the light transmission area 41. On this basis, it may be ensured that when the main spacer moves by being subjected to a pressure, it will be in contact with at most a part of the orientation layer, which is located on the top of the first raised structure 61 and in the light transmission area 41, of the array substrate, and is not to be in contact with the other part of the orientation layer, which is located in the other region of the light transmission area 41, of the array substrate. For example, in some situations, the main spacer 71 will not cross over the first raised structure 61 when it moves by being subjected to a pressure, due to the blocking of the first raised structure 61. In some situations, as shown in FIG. 4 and FIG. 5, the main spacer 71 moves to the top of the first raised structure 61 and at most a part of the main spacer 71 is beyond the first raised structure 61. In this way, it is ensured that the part of the main spacer 71 beyond the first raised structure 61 is not in contact with the orientation layer of the array substrate.

On the basis of the above, when the first raised structure 61 crosses over the boundary of the light transmission area 41 and the main spacer moves to the top of the first raised structure 61, the part of the orientation layer, which is located on the top of the first raised structure 61, of the array substrate may still be damaged, resulting in poor orientation therein. Therefore, if the first raised structure 61 is transparent, light leakage may occur. On this basis, in some embodiments, when at least part of the first raised structure 61 crosses over the boundary of the light transmission area 41, the first raised structure 61 is opaque. In this way, even if the part of the orientation layer, which is located on the top of the first raised structure 61, of the array substrate is damaged, the light leakage will not occur, due to the fact that the first raised structure 61 is opaque.

When the first raised structure 61 is located between the main spacer initial contact area 51 and the boundary of the light transmission area 41, due to the shielding function of the black matrix, in some embodiments, the first raised structure 61 is transparent, and in other embodiments, the first raised structure 61 is opaque.

In the array substrate provided by some embodiments of the present disclosure, by providing the first raised structure 61, the movement of the main spacer is to be blocked to reduce the moving distance of the main spacer under a pressure, after the array substrate and the alignment substrate including the main spacer are aligned. As a result, this can avoid the light leakage resulted from the fact that the main spacer moves to the light transmission area 41 by being subjected to a pressure and damages the orientation layer of the array substrate. When the first raised structure 61 is located on the edge of the light transmission area 41 with its part or entirety crossing over the boundary of the light transmission area 41, by making the first raised structure 61 opaque, it is still able to ensure avoiding the light leakage, when the main spacer moves to the top of the first raised structure 61 and damages the part of the orientation layer therein. Compared to the solution that widening a part of the black matrix corresponding to the region which the main spacer initial contact area belongs to and leading to a significant reduction in aperture ratio, to ensure that the main spacer is still to be shielded by the black matrix when it moves the maximum distance, some embodiments of the present disclosure are able to ignore the light leakage resulted from the movement of the main spacer under a pressure when arranging the black matrix, and thus, the aperture ratio is improved.

In some embodiments of the present disclosure, referring to FIG. 4, a first distance D1 between a side of the main spacer initial contact area 51 near the first raised structure 61 and a side of the first raised structure 61 away from the main spacer initial contact area 51, is larger than or equal to a difference between the maximum moving distance T1 of the main spacer and a half of a length L1 of the main spacer in a direction along the data lines 30.

That is, $D1 \geq T1 - 1/2 \times L1$. And, the first raised structure 61 is located near the end of the maximum moving distance of the main spacer.

With $D1 \geq T1 - 1/2 \times L1$, after the array substrate and the alignment substrate are aligned, even if the main spacer moves the maximum distance, leading to the fact that a half of the main spacer is located on the first raised structure 61, since the main spacer has already moved the maximum distance by being subjected to a pressure, the other half will not slide down from the side of the first raised structure 61 away from the main spacer initial contact area 51 and will not fall into the light transmission area 41. On this basis, since the suspended part of the main spacer is not in contact with the orientation layer of the array substrate, the corresponding part of the orientation layer of the array substrate may be prevented from being damaged.

On this basis, in some embodiments, the first raised structure 61 is located on the edge of the light transmission area 41 with its part crossing over the boundary of the light transmission area 41, and the first raised structure 61 is opaque. Thus, there is sufficient distance between the first raised structure 61 and the main spacer initial contact area 51 for the movement of the main spacer, and the influence on the aperture ratio is small.

In some embodiments of the present disclosure, the thickness of the first raised structure 61 is increased from the edge to the center. In this way, the first raised structure 61 is easy to produce, and breakage defects at this position due to a large height difference caused by a same thickness of the edge and the center of the structure may not be caused during subsequent processes.

In some embodiments of the present disclosure, as shown in FIG. 5, the side of the first raised structure 61 near the main spacer initial contact area 51 is in a stepped structure. In some embodiments of the present disclosure, as shown in FIG. 5, an side of the first raised structure 61 which is opposite to this foregoing side is also in a stepped structure.

By providing the edge part of the first raised structure 61 being in the stepped structure, the movement of the main spacer may be greatly blocked. Particularly in the situation that the first raised structure 61 is located near the end of the maximum moving distance of the main spacer, when the main spacer moves to the first raised structure 61, the movement tendency thereof is already relatively small, and on this basis, the side of the first raised structure 61 near the main spacer, which is in the stepped structure, may apply a greater blocking function to the movement of the main spacer, and thus it is ensured that at most half of the main spacer may be beyond the first raised structure 61 and suspended thereon.

Figure 6:
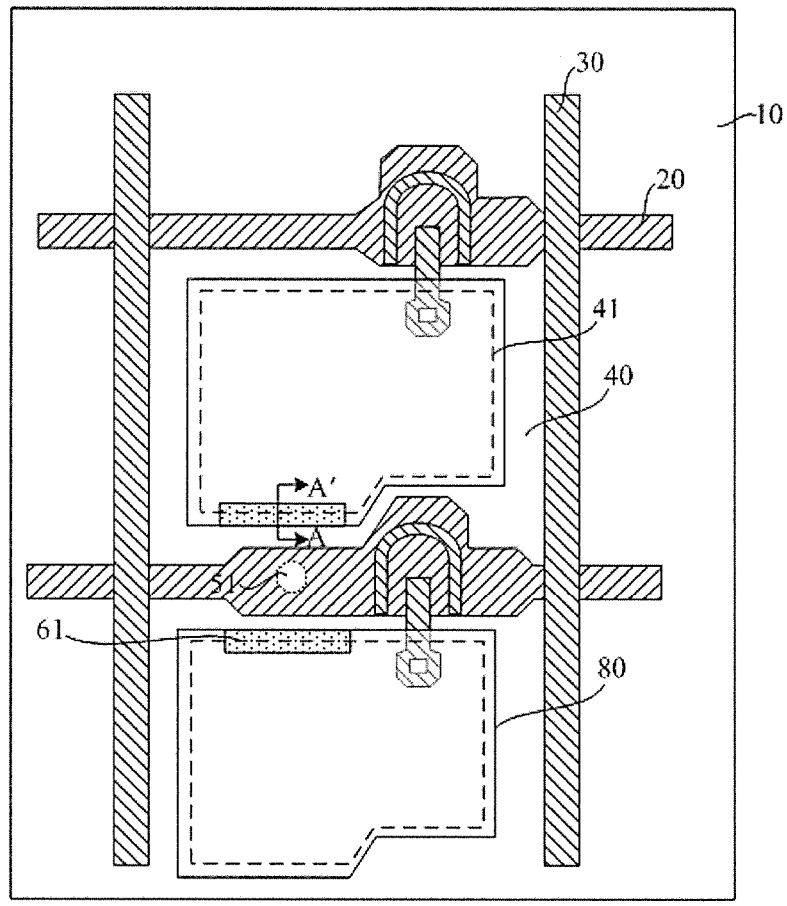
FIG. 6 is a top view of an array substrate according to some further embodiments of the present disclosure.
Figure 7:
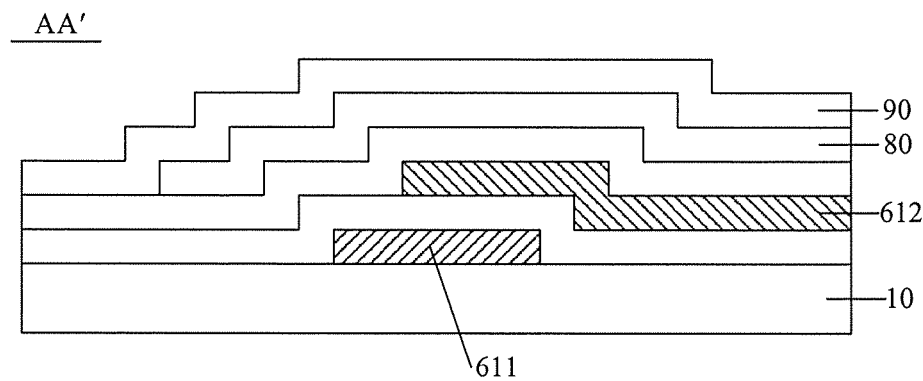
FIG. 7 is a sectional view along a direction of AA' in FIG. 6.

In some embodiments of the present disclosure, as shown in FIG. 6 and FIG. 7, the first raised structure 61 includes a first pattern layer 611 and a second pattern layer 612. The first pattern layer 611 and the gate lines 20 are arranged in a same layer. The second pattern layer 612 and the data lines 30 are arranged in a same layer.

By making the first raised structure 61 include the first pattern layer 611 and the second pattern layer 612, the first pattern layer 611 and the gate lines 20 be arranged in the same layer, and the second pattern layer 612 and the data lines 30 be arranged in the same layer, increasing of times of patterning processes may be avoided.

Since an insulating layer and the orientation layer 90 which are arranged on the array substrate spread on the first base substrate 10, the first raised structure 61 also includes a part of the insulating layer and a part of the orientation layer 90.

It should be noted that, in some embodiments of the present disclosure, when the first raised structure 61 is located on the edge of the light transmission area 41 with its part or entirety crossing over the boundary of the light transmission area 41 close to the main spacer initial contact area 51, the first raised structure 61 further includes a part of a pixel electrode 80.

Figure 8:
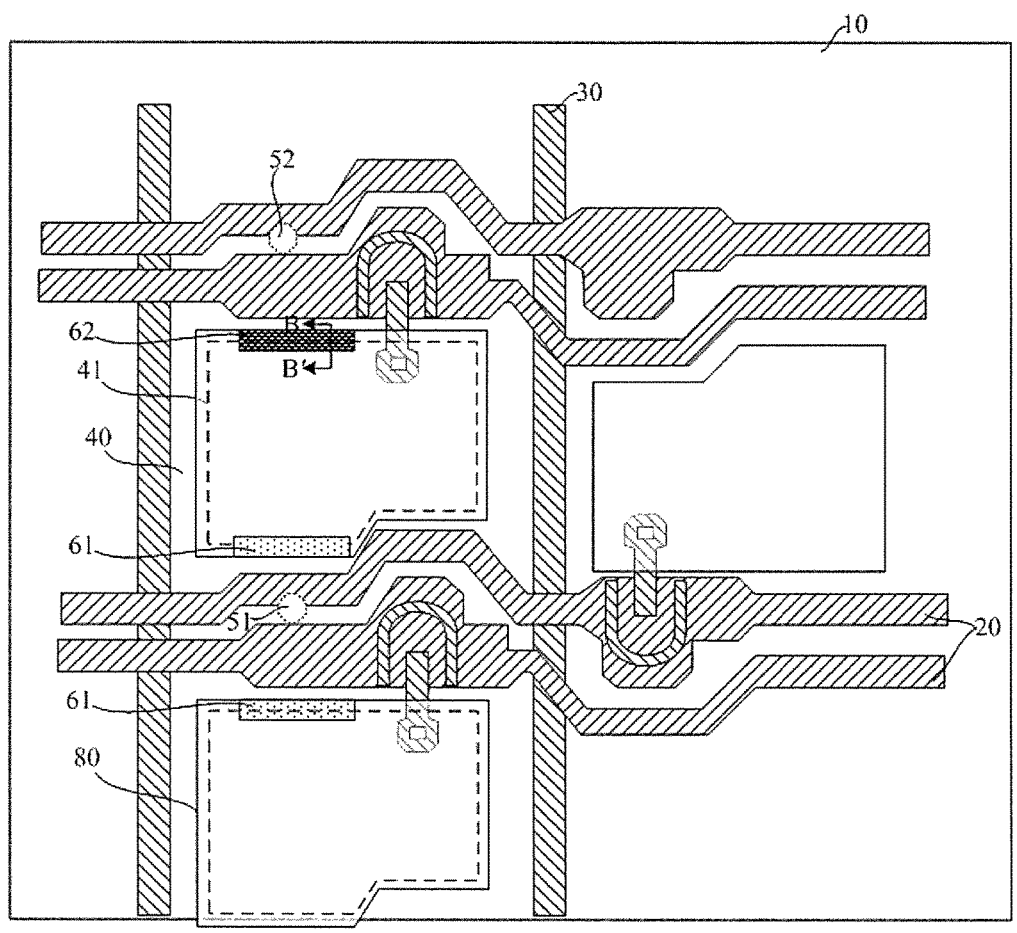
FIG. 8 is a top view of an array substrate according to some yet other embodiments of the present disclosure.

Considering that the main spacer initial contact area 51 is generally located in one of regions which are respectively between adjacent ones of pixel regions and are provided with some of the gate lines 20, as shown in FIG. 8, in some embodiments of the present disclosure, the gate lines 20 arranged between adjacent ones of the pixel regions 40 are in pair.

That is, two gate lines 20 pass through a region which is arranged between two adjacent pixel regions and is provided with at least one gate line 20.

It should be noted that, the arrangement of two gate lines 20 between the adjacent pixel regions 40 is merely as an alternative, other arrangements of the gate lines 20 are also applicable to the present disclosure.

Since there is a gap between the two gate lines 20 and each of the two gate lines 20 is wide, one region, which is between adjacent pixel regions and is provided with gate lines 20, is wider. It may be further ensured that the main spacer will not move to the light transmission area 41 when it is subjected to a pressure. Alternatively, it may be ensured that even though the main spacer moves to the light transmission area 41, it eventually stays on the top of the first raised structure 61.

In some embodiments of the present disclosure, the main spacer initial contact area 51 is located on one of the regions which are respectively next to the pixel regions 40 in blue and are provided with some of the gate lines 20.

Since a person's visual sensitivity to blue light is much lower than that to red light or green light, even if the width of a gate line 20 arranged beside a pixel region 40 in blue is made larger than that of the gate lines 20 in other positions and the area of a light transmission area of the pixel region 40 in blue is made smaller, the normal display may not be affected.

In some embodiments of the present disclosure, as shown in FIG. 8, the array substrate further includes a second raised structure 62 arranged between an auxiliary spacer initial projection area 52 and a light transmission area 41. The second raised structure 62 is configured to provide a blocking function to a movement of an auxiliary spacer.

It should be noted that, the auxiliary spacer initial projection area 52 is a projection area of the auxiliary spacer of the alignment substrate on the array substrate when the auxiliary spacer has not moved, after the array substrate and the alignment substrate are aligned.

The second raised structure 62 is located between the auxiliary spacer initial projection area 52 and a light transmission area 41. It is not limited that the second raised structure 62 cannot cross over a boundary of the light transmission area 41. In some embodiments, the second raised structure 62 is located on an edge of the light transmission area 41 with its part or entirety crossing over the boundary of the light transmission area 41.

In some embodiments, a specific location of the second raised structure 62 depends on a moving distance of the auxiliary spacer and a specific structure of the second raised structure 62. In some embodiments, the moving distance of the auxiliary spacer is obtained according to test data for various types of products.

For example, in some embodiments, the second raised structure is located between the auxiliary spacer initial projection area 52 and the boundary of the light transmission area 41 near the auxiliary spacer initial projection area 52. On this basis, it may be ensured that the auxiliary spacer will not be contact with a part of the orientation layer, which is located in the light transmission area 41, of the array substrate, when the auxiliary spacer moves by being subjected to a pressure. For example, in some situations, when the auxiliary spacer moves by being subjected to a pressure, the auxiliary spacer is stopped on a side of the second raised structure 62 away from the light transmission area 41, due to the blocking of the second raised structure 62. That is, the auxiliary spacer will not cross over the second raised structure 62. In some other situations, when the auxiliary spacer moves by being subjected to a pressure, as the auxiliary spacer has a limited moving distance, although the auxiliary spacer crosses over the second raised structure 62, it will not reach the light transmission area 41. In some further situations, when the auxiliary spacer moves by being subjected to a pressure, although a part of the auxiliary spacer move to the light transmission area 41, because of the limited moving distance, the auxiliary spacer is located on the second raised structure 61. Due to the height of the second raised structure 62, it is ensured that the part of the auxiliary spacer located above the light transmission area 41 is not in contact with the orientation layer of the array substrate.

In some embodiments, the second raised structure 62 is located on the edge of the light transmission area 41 near the auxiliary spacer initial projection area 52, with its part or entirety crossing over the boundary of the light transmission area 41. On this basis, it may be ensured that when the auxiliary spacer moves by being subjected to a pressure, it will be in contact with at most a part of the orientation layer which is located on the top of the second raised structures 62 and in the light transmission area 41, of the array substrate, and is not to be contact with the other part of the orientation layer of the array substrate which is located in the other part of the light transmission area 41. In this situation, the auxiliary spacer will not cross over the second raised structure 62 when it moves by being subjected to a pressure. In other situations, the auxiliary spacer moves to the top of the second raised structure 62 and at most a part of the auxiliary spacer is beyond the second raised structure 62. In this way, it is ensured that the part of the auxiliary spacer beyond the second raised structure 62 is not in contact with the orientation layer of the array substrate.

On the basis of the above, when the second raised structure 62 crosses over the boundary of the light transmission area 41 and the auxiliary spacer moves to the top of the second raised structure 62, the part of the orientation layer of the array substrate which is located on the top of the second raised structure 62 may still be damaged, resulting in poor orientation therein. Therefore, if the second raised structure 62 is transparent, light leakage may occur. On this basis, in some embodiments, when at least part of the second raised structure 62 crosses over the boundary of the light transmission area 41, the second raised structure 62 is opaque. In this way, even if the part of the orientation layer of the array substrate which is located on the top of the second raised structures 62 is damaged, the light leakage may not occur due to the fact that the second raised structure 62 is opaque.

When the second raised structure 62 is located between the auxiliary spacer initial projection area 52 and the boundary of the light transmission area 41, due to the shielding function of the black matrix, in some embodiments, the second raised structure 62 is transparent, and in other embodiments, the second raised structure 62 is opaque.

By providing the second raised structure 62, the movement of the auxiliary spacer is to be blocked to reduce the moving distance of the auxiliary spacer under a pressure, after the array substrate and the alignment substrate including the main spacer and the auxiliary spacer are aligned. As a result, this can avoid the light leakage resulted from the fact that the auxiliary spacer moves to the light transmission area 41 by being subjected to a pressure and damages the orientation layer of the array substrate. When the second raised structure 62 is located on the edge of the light transmission area 41 with its part or entirety crossing over the boundary of the light transmission area 41, by making the second raised structure 62 opaque, it is still able to ensure avoiding the light leakage, when the auxiliary spacer moves on the top of the second raised structure 62 and damages the part of the orientation layer therein. Compared to the solution that widening a part of the black matrix corresponding to the region which the auxiliary spacer initial projection area belongs to and leading to a significant reduction in aperture ratio, to ensure that the auxiliary spacer is still to be shielded by the black matrix when the auxiliary spacer moves the maximum distance, some embodiments of the present disclosure are able to ignore the light leakage due to the movement of the auxiliary spacer under a pressure when arranging the black matrix, and thus, the aperture ratio is improved.

Figure 9:
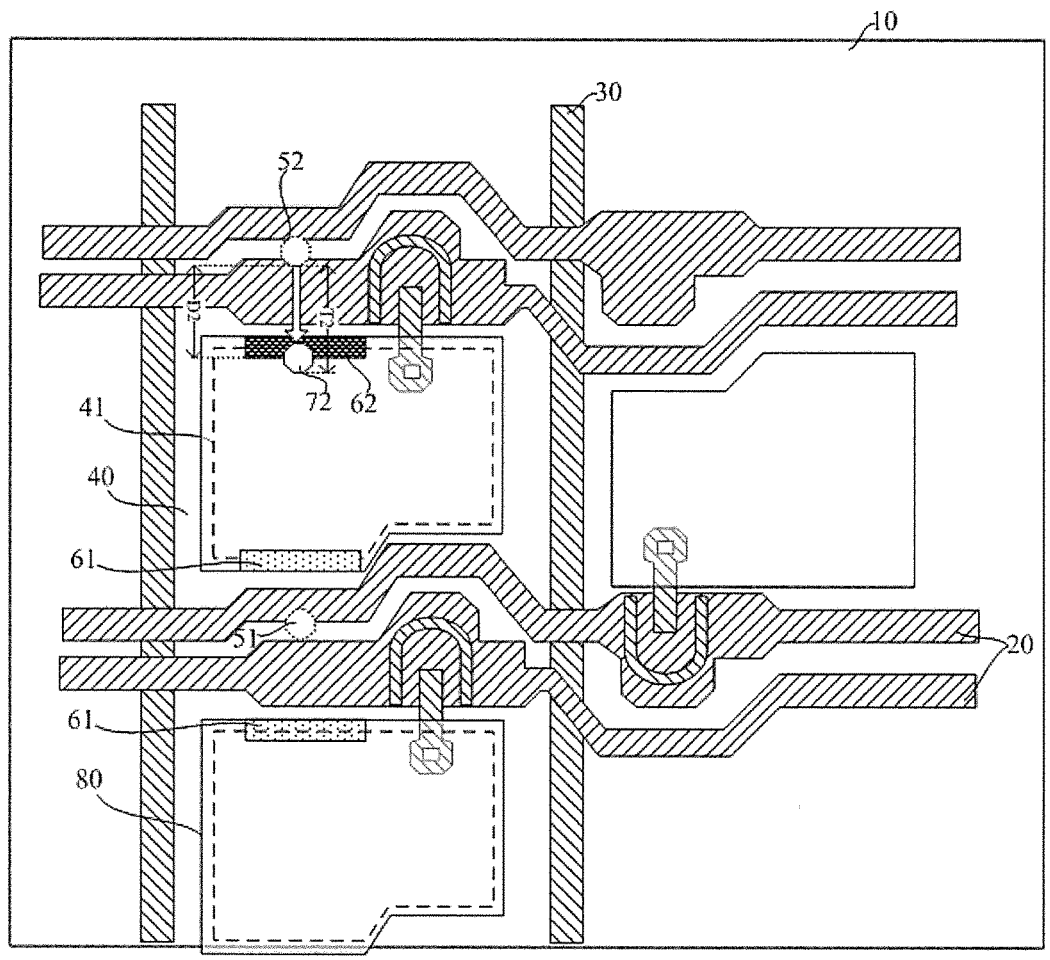
FIG. 9 is a schematic diagram of a movement of an auxiliary spacer acted upon by a force, according to some embodiments of the present disclosure.

In some embodiments of the present disclosure, referring to FIG. 9, a second distance D2 between a side of the auxiliary spacer initial projection area 52 near the second raised structure 62 and a side of the second raised structure 62 away from the auxiliary spacer initial projection area 52, is larger than or equal to a difference between the maximum moving distance T2 of the auxiliary spacer 72 and a half of a length L2 of the auxiliary spacer in a direction along the data lines 30.

That is, $D2 \geq T2 - 1/2 \times L2$. And, the second raised structure 62 is located near the end of the maximum moving distance of the auxiliary spacer.

With $D2 \geq T2 - 1/2 \times L2$, after the array substrate and the alignment substrate are aligned, even if the auxiliary spacer moves the maximum distance, leading to the fact that a half of the auxiliary spacer is located on the second raised structure 62, since the auxiliary spacer has already moved the maximum distance by being subjected to a pressure, the other half will not slide down from the side of the second raised structure 62 away from the auxiliary spacer initial projection area 52 and will not fall into the light transmission area 41. On this basis, since the suspended part of the auxiliary spacer is not in contact with the orientation layer of the array substrate, the corresponding part of the orientation layer of the array substrate may be prevented from being damaged.

On this basis, in some embodiments, the second raised structure 62 is located on the edge of the light transmission area 41 with its part crossing over the boundary of the light transmission area 41 and, and the second raised structure 62 is opaque. Thus, there is sufficient distance between the second raised structure 62 and the auxiliary spacer initial projection area 52 for the movement of the auxiliary spacer, and the influence on the aperture ratio is small.

In some embodiments of the present disclosure, the thickness of the second raised structure 62 is increased from the edge to the center. And furthermore, in some embodiments of the present disclosure, the side of the second raised structure 62 near the auxiliary spacer initial projection area 52 is in a stepped structure.

By providing the edge part of the second raised structure 62 being in the stepped structure, the movement of the auxiliary spacer may be greatly blocked. Particularly in the situation that the second raised structure 62 is located near the end of the maximum moving distance of the auxiliary spacer, when the auxiliary spacer moves to the second raised structure 62 by being subjected to a pressure, the movement tendency thereof is already relatively small, and on this basis, the side of the second raised structure 62 near the auxiliary spacer is in the stepped structure, which may apply a greater blocking function to the movement of the auxiliary spacer, thus it is ensured that at most half of the auxiliary spacer may be beyond the second raised structure 62 and suspended thereon.

Figure 10:
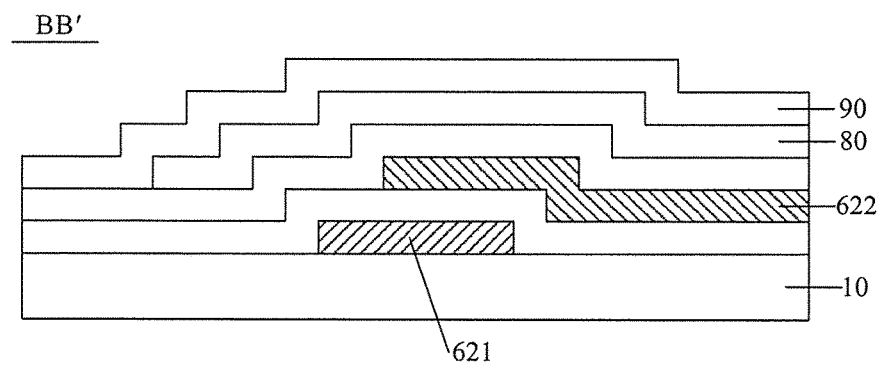
FIG. 10 is a sectional view along a direction of BB' in FIG. 8.

In some embodiments of the present disclosure, as shown in FIG. 10, the second raised structure 62 includes a third pattern layer 621 and a fourth pattern layer 622. The third pattern layer 621 and the gate lines 20 are arranged in a same layer. The fourth pattern layer 622 and the data lines 30 are arranged in a same layer.

By making the second raised structure 62 include the third pattern layer 621 and the fourth pattern layer 622, the third pattern layer 621 and the gate lines 20 be arranged in the same layer, and the fourth pattern layer 622 and the data lines 30 be arranged in the same layer, increasing of times of the patterning processes can be avoided.

Since the insulating layer and the orientation layer 90 which are arranged on the array substrate spread on the first base substrate 10, the second raised structure 62 also include a part of the insulating layer and a part of the orientation layer 90.

It should be noted that, in some embodiments of the present disclosure, when the second raised structures 62 is located on the edge of the light transmission area 41 with its part or entirety crossing over the boundary of the light transmission area 41 close to the auxiliary spacer initial projection area 52, the second raised structure 62 further includes a part of a pixel electrode 80.

Figure 11:
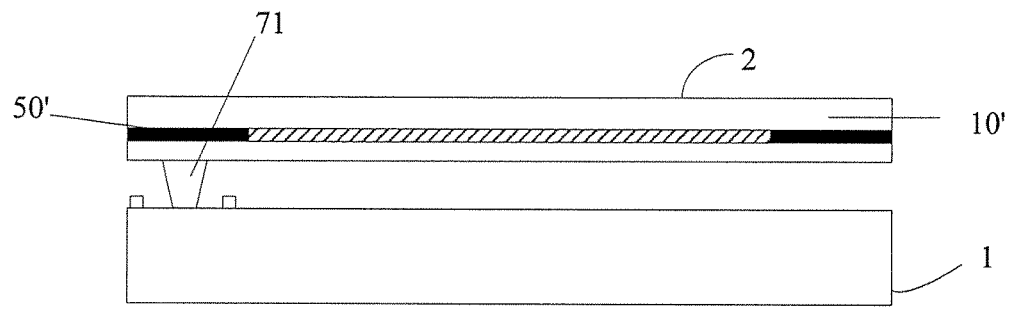
FIG. 11 is a structural diagram of a part of a display panel according to some embodiments of the present disclosure.

Some embodiments of the present disclosure provide a display panel 1000. As shown in FIG. 11, the display panel 1000 includes an array substrate 1 according to the above embodiments and an alignment substrate 2. The alignment substrate 2 includes a second base substrate 10' and a main spacer 71 arranged on the second base substrate 10'. The main spacer 71 is in contact with the main spacer initial contact area 51 when there has been no force acted on the display panel. There is the same effect with the foregoing array substrate, and it will not be elaborated herein.

Figure 12:
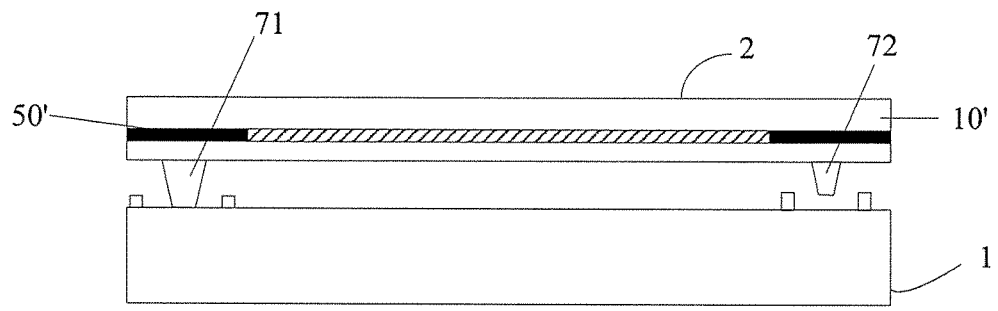
FIG. 12 is a structural diagram of a part of the display panel according to some other embodiments of the present disclosure.

In some embodiments of the present disclosure, as shown in FIG. 12, the alignment substrate 2 further includes an auxiliary spacer 72 arranged on the second base substrate 10'. And, the array substrate 1, as shown in FIG. 8, includes a second raised structure 62 arranged between an auxiliary spacer initial projection area 52 and a light transmission area 41. The second raised structure 62 is configured to provide a blocking function to a movement of the auxiliary spacer 72. The projection of the auxiliary spacer 72 on the array substrate is located in the auxiliary spacer initial projection area 52 when there has not been a force acted on the display panel 1000.

In some embodiments of the present disclosure, the alignment substrate further includes a black matrix 50' arranged on the second base substrate. The light transmission areas on the array substrate are outside the shielding provided by the black matrix 50'.

The black matrix is disposed in the alignment substrate, reducing the difficulty of manufacturing the array substrate, and the process is mature.

Figure 13:
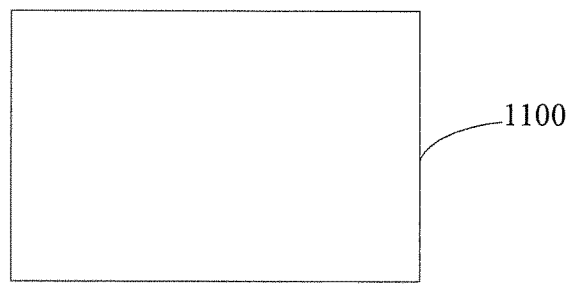
FIG. 13 is a schematic diagram of a display device according to some embodiments of the present disclosure.

Some embodiments of the present disclosure provide a display device 2000. As shown in FIG. 13, the display device 2000 includes the foregoing display panel 1000.

The display device can be a LCD TV, a laptop, a tablet computer, a smartphone, or the like.

The above descriptions are only specific implementations of the present disclosure, but the protection scope of the present disclosure is not limited thereto, the changes or modifications that can be easily figured out by a person of ordinary skill in the art within the technical scope disclosed herein, should fall within the protection scope of the present disclosure. Therefore, the protection scope of the present disclosure is subject to the protection scope of the claims.

Additional embodiments including any one of the embodiments described above may be provided by the disclosure, where one or more of its components, functionalities or structures are interchanged with, replaced by or augmented by one or more of the components, functionalities or structures of a different embodiment described above.

What is claimed is:

1. An array substrate, comprising:
   a first base substrate;
   gate lines and data lines arranged on the first base substrate, wherein the gate lines and the data lines crosswise define pixel regions, the gate lines arranged between adjacent ones of the pixel region are in pair, and the pixel regions comprise light transmission areas wherein one pixel region comprises one light transmission area; and
   a first raised structure arranged between a main spacer initial contact area and one of the light transmission areas, wherein the first raised structure is configured to provide a block function to a movement of a main spacer.

2. The array substrate according to claim 1, wherein a first distance between a side of the main spacer initial contact area close to the first raised structure and a side of the first raised structure away from the main spacer initial contact area, is larger than a difference between a maximum moving distance of the main spacer and a half of a length of the main spacer in a direction along the data lines.

3. The array substrate according to claim 1, wherein a thickness of the first raised structure is increased from an edge to a center.

4. The array substrate according to claim 3, wherein a side of the first raised structure close to the main spacer initial contact area is in a stepped structure.

5. The array substrate according to claim 1, wherein the first raised structure comprises a first pattern layer and a second pattern layer;
the first pattern layer and the gate lines are arranged in a same layer; and the second pattern layer and the data lines are arranged in a same layer.

6. The array substrate according to claim 1, wherein the main spacer initial contact area is located on one of the regions which are respectively next to the pixel regions in blue and are provided with some of the gate lines.

7. The array substrate according to claim 1, further comprising a second raised structure arranged between an auxiliary spacer initial projection area and one of the light transmission areas, and the second raised structure is configured to provide a blocking function to a movement of an auxiliary spacer.

8. The array substrate according to claim 7, wherein a second distance between a side of the auxiliary spacer initial projection area close to the second raised structure and a side of the second raised structure away from the auxiliary spacer initial projection area, is larger than a difference between a maximum moving distance of the auxiliary spacer and a half of a length of the auxiliary spacer in the direction along the data lines.

9. The array substrate according to claim 7, wherein a thickness of the second raised structure is increased from an edge to a center.

10. The array substrate according to claim 9, wherein a side of the second raised structure close to the auxiliary spacer initial projection area is in a stepped structure.

11. The array substrate according to claim 7, wherein the second raised structure comprises a third pattern layer and a fourth pattern layer;
the third pattern layer and the gate lines are arranged in a same layer; and the fourth pattern layer and the data lines are arranged in a same layer.

12. A display panel, comprising the array substrate according to claim 1 and an alignment substrate, wherein
   the alignment substrate comprises a second base substrate and a main spacer arranged on the second base substrate; and
   the main spacer is in contact with the main spacer initial contact area when there has been no force acted on the display panel.

13. The display panel according to claim 12, wherein:
   the alignment substrate further comprises an auxiliary spacer arranged on the second base substrate,
   the array substrate further comprises a second raised structure arranged between an auxiliary spacer initial projection area and one of the light transmission areas, and the second raised structure is configured to provide a blocking function to a movement of the auxiliary spacer.

14. The display panel according to claim 12, wherein, the alignment substrate further comprises a black matrix arranged on the second base substrate; and the light transmission areas on the array substrate are outside a shielding provided by the black matrix.

15. A display device, comprising the display panel according to claim 12.

* * * * *